(12) United States Patent
Chen et al.

(10) Patent No.: US 10,660,176 B2
(45) Date of Patent: May 19, 2020

(54) SYSTEM AND METHOD FOR DRIVING LIGHT SOURCE COMPRISING VOLTAGE FEEDBACK CIRCUIT AND CURRENT FEEDBACK CIRCUIT

(71) Applicant: O2Micro, Inc., Santa Clara, CA (US)

(72) Inventors: Jen-Chun Chen, Taipei (TW);
Sheng-Tai Lee, Hsinchu (TW);
Yung-Lin Lin, Palo Alto, CA (US)

(73) Assignee: O2Micro Inc., Santa Clara, CA (US)

( * ) Notice: Subject to any disclaimer, the term of this patent is extended or adjusted under 35 U.S.C. 154(b) by 0 days.

(21) Appl. No.: 15/414,003

(22) Filed: Jan. 24, 2017

(65) Prior Publication Data

US 2019/0254130 A1    Aug. 15, 2019

Related U.S. Application Data

(60) Provisional application No. 62/286,752, filed on Jan. 25, 2016.

(30) Foreign Application Priority Data

Jan. 15, 2017    (GB) .................................. 1700145.4

(51) Int. Cl.
*H05B 45/37* (2020.01)
*H05B 45/10* (2020.01)
(Continued)

(52) U.S. Cl.
CPC ........ *H05B 45/37* (2020.01); *H02M 3/33576* (2013.01); *H05B 45/10* (2020.01);
(Continued)

(58) Field of Classification Search
CPC .......................... H05B 37/02; H05B 37/0281; H05B 37/0218; H05B 37/0272; H05B 41/2828; H05B 41/28; H05B 41/2827; H05B 41/2855; H05B 41/295; H05B 47/00; H05B 47/10; H05B 47/14; H05B 47/24; H05B 47/395; H05B 33/0851; H05B 33/0848; H05B 33/0812; H05B 33/0845; H05B 33/842; H05B 33/0806; H05B 33/0866; H05B 33/0815; H05B 33/0827; H05B 33/0818; H05B 33/0809; H05B 33/0803; H05B 33/0842; H05B 33/0857; H05B 33/0887; H05B 33/0824; H05B 33/083;
(Continued)

(56) References Cited

U.S. PATENT DOCUMENTS 9,301,347 B2 * 3/2016 Acharya ............ H05B 33/0812
2011/0037410 A1 * 2/2011 Hsu .................... H05B 33/0815
315/294
(Continued)

*Primary Examiner* — Tung X Le
*Assistant Examiner* — Borna Alaeddini

(57) ABSTRACT

A system for driving a light source includes a power converter and control circuitry coupled to the power converter. The power converter converts input power to an output voltage to power the light source. The control circuitry senses the output voltage and senses current of the light source. The control circuitry generates a control signal based on a voltage feedback signal indicative of a combination of said output voltage and said current of said light source, and controls the power converter by the control signal to adjust the output voltage.

16 Claims, 5 Drawing Sheets

(51) Int. Cl.
*H05B 45/46* (2020.01)
*H05B 45/48* (2020.01)
*H02M 3/335* (2006.01)
*H02M 1/00* (2006.01)

(52) U.S. Cl.
CPC ............ *H05B 45/46* (2020.01); *H05B 45/48* (2020.01); *H02M 2001/0009* (2013.01)

(58) Field of Classification Search
CPC .. H05B 33/0863; H05B 33/089; H05B 33/08; H05B 33/0821; H05B 33/086; H05B 33/0869; H02M 3/3353; H02M 2001/0009
See application file for complete search history.

(56) References Cited

U.S. PATENT DOCUMENTS

| | | | | |
|---|---|---|---|---|
| 2011/0227497 | A1* | 9/2011 | Hu | H05B 33/0809 315/224 |
| 2012/0274290 | A1* | 11/2012 | Ye | H02M 3/156 323/234 |
| 2013/0313995 | A1* | 11/2013 | Sadwick | H05B 37/02 315/287 |
| 2016/0143104 | A1* | 5/2016 | Chen | H05B 33/0815 315/200 R |
| 2017/0079111 | A1* | 3/2017 | Rezeanu | H05B 33/0887 |

\* cited by examiner

SYSTEM AND METHOD FOR DRIVING LIGHT SOURCE COMPRISING VOLTAGE FEEDBACK CIRCUIT AND CURRENT FEEDBACK CIRCUIT

RELATED APPLICATIONS

This application claims priority to U.S. Provisional Application No. 62/286,752, titled "Light-source Driving Systems," filed on Jan. 25, 2016, which is hereby incorporated by reference in their entirety.

BACKGROUND

FIG. 1 illustrates a block diagram of a conventional light-source driving system 100 for driving a light source 110. The light-source driving system 100 includes a full-bridge rectifier 102, an AC/DC (alternating current to direct current) converter 104, a DC/DC converter 150, a feedback circuit 108, and a controller 112.

The rectifier 102 rectifies an AC voltage $V_{AC}$ (e.g., 220 VAC, 110 VAC, or the like from an electric supply) to provide a rectified power to the AC/DC converter 104. The AC/DC converter 104 converts the rectified power to a DC voltage $V_{DC}$ according a signal 106 from the feedback circuit 108. The signal 106 represents a level of the DC voltage $V_{DC}$ and functions as a feedback to control the AC/DC converter 104 such that the DC voltage $V_{DC}$ is maintained at a constant target voltage level. The DC/DC converter 150 includes an inductor $L_B$, a diode 114, and a switch $Q_{SW}$. When the switch $Q_{SW}$ is on, an increasing current can flow through the inductor $L_B$ from the AC/DC converter 104 to ground, and the inductor $L_B$ stores energy. When the switch $Q_{SW}$ is off, the inductor $L_B$ releases energy, and the energy released from the inductor $L_B$, together with the power, e.g., the DC voltage $V_{DC}$, from the AC/DC converter 104, are transformed to an output current $I_O$ to flow through the light source 110. The controller 112 can sense the output current $I_O$ and generate a control signal 116 to control the switch $Q_{SW}$ according to the output current $I_O$, thereby adjusting the output current $I_O$ to a target current level.

Due to non-ideality of circuit components in the controller 112 and/or variation in ambient temperature, the output current $I_O$ may change even if the output voltage $V_O$ of the DC/DC converter 150 remains constant. Thus, the controller 112 controls the DC/DC converter 150 to increase or decrease the output voltage $V_O$, thereby maintaining the output current $I_O$ at the target current level. Additionally, light sources having controllable brightness are widely used in many applications. For example, a user may increase or decrease a brightness of the light source 110 by rotating a knob-like switch. The changes in the brightness is caused by increasing or decreasing the output current $I_O$ flowing through the light source 110, which can also be caused by increasing or decreasing the output voltage $V_O$. Thus, when the target current level of the output current $I_O$ is changed, e.g., by a user, the controller 112 can control the DC/DC converter 150 to increase or decrease the output voltage $V_O$, thereby adjusting the output current $I_O$ to the new target current level.

Thus, the light-source driving system 100 includes an AC/DC converter 104 to convert an AC voltage $V_{AC}$ to a constant DC voltage $V_{DC}$, and includes a DC/DC converter 150 to convert the DC voltage $V_{DC}$ to an adjustable output voltage $V_O$. The DC/DC converter 150 increases or decreases the output voltage $V_O$ to adjust the output current $I_O$ to a target current level. However, the DC/DC converter 150 consumes power, which increases power consumption and reduces a power efficiency of the light-source driving system 100. The DC/DC converter 150 also occupies a relatively large area of a PCB (printed circuit board), which increases the size of a PCB for the light-source driving system 100. The DC/DC converter 150 also increases the cost of the light-source driving system 100.

SUMMARY

In one embodiment, a system for driving a light source includes a power converter and control circuitry coupled to the power converter. The power converter converts input power to an output voltage to power the light source. The control circuitry senses the output voltage and senses current of the light source. The control circuitry generates a control signal based on a voltage feedback signal indicative of a combination of said output voltage and said current of said light source, and controls the power converter by the control signal to adjust the output voltage.

In another embodiment, a method for driving a light source includes: converting an input power to an output voltage to power a light source; sensing the output voltage and current of the light source; generating a control signal based on a voltage feedback signal indicative of a combination of the output voltage and the current of the light source; and controlling the power converter by the control signal to adjust the output voltage.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
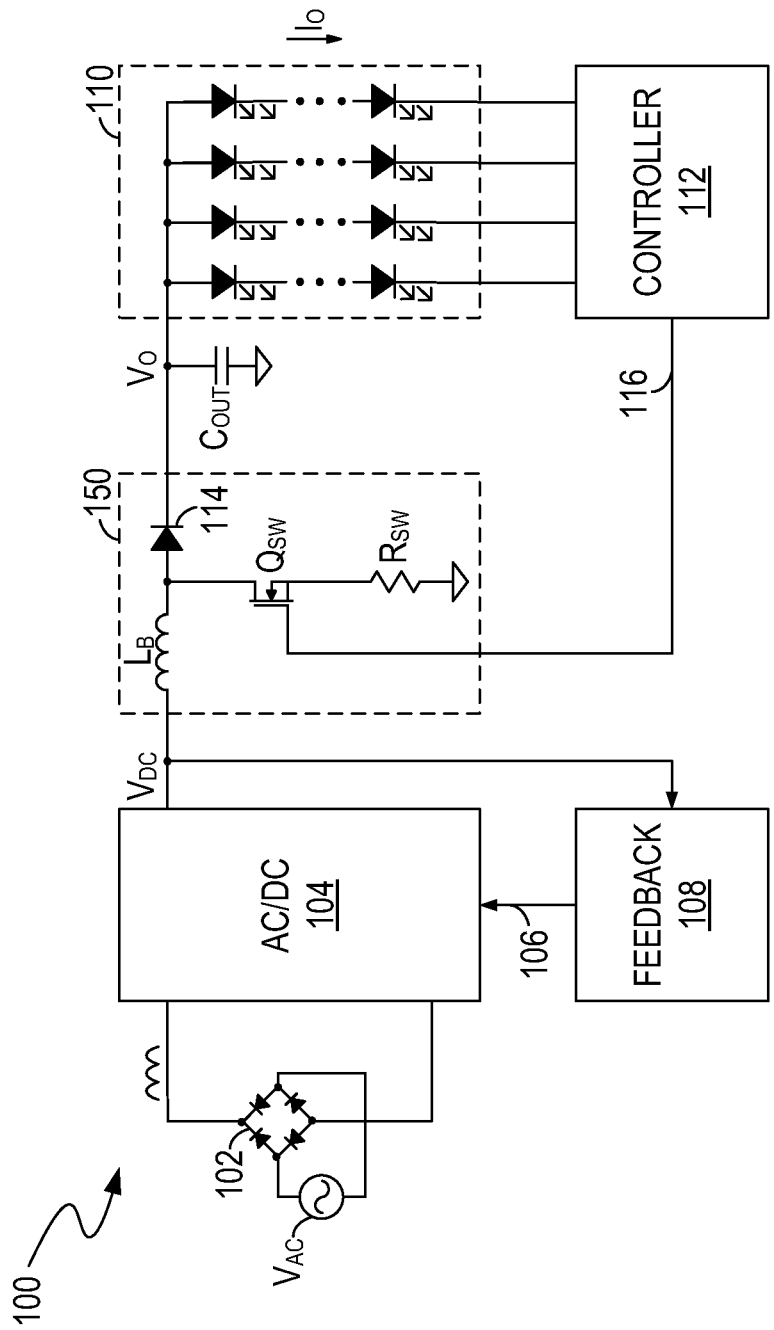
FIG. 1 illustrates a block diagram of a conventional light-source driving system.

In an embodiment according to the present invention, a light-source driving system includes control circuitry capable of controlling an output voltage of an AC/DC converter according to a feedback signal indicative of a combination of the output voltage and an output current (or currents) flowing through a light source. As a result, the light-source driving system can maintain the output current (or currents) at a target current level. In the light-source driving system in an embodiment according to the present invention, a DC/DC converter in a conventional light-source driving system, e.g., the DC/DC converter 150 mentioned in relation to FIG. 1, can be omitted.

Figure 2A:
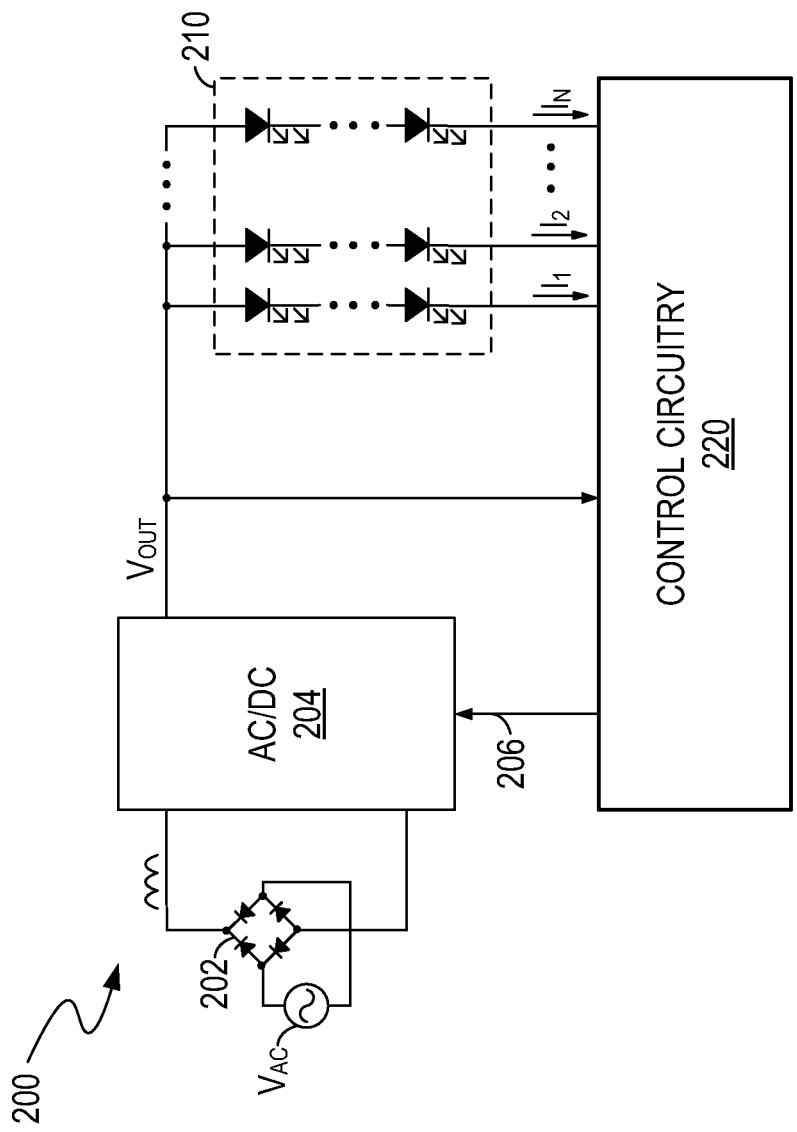
FIG. 2A illustrates a block diagram of an example of a light-source driving system, in an embodiment according to the present invention.

FIG. 2A illustrates a block diagram of an example of a light-source driving system 200 for powering a light source 210, in an embodiment according to the present invention. The light-source driving system 200 can include a rectifier 202, e.g., a full-bridge rectifier, a power converter, e.g., an AC/DC converter 204, and control circuitry 220. In the example of FIG. 2, the light source 210 includes multiple LED (light-emitting diode) strings coupled in parallel. However, the invention is not so limited. In another embodiment, the light source 210 can include one LED, multiple LEDs coupled in parallel, or one LED string. The rectifier 202 can receive an AC voltage $V_{AC}$, e.g., 220 VAC, 110 VAC, or the like from an electric supply via a power socket, and provide rectified power, e.g., input power, to the AC/DC converter 204. The AC/DC converter 204 converters the input power to an output voltage $V_{OUT}$. The output voltage $V_{OUT}$ can power the light source 210. The control circuitry 220 can sense the output voltage $V_{OUT}$ and output currents $I_1, I_2, \ldots, I_N$ (or LED currents $I_1, I_2, \ldots, I_N$) flowing through the LED strings in the light source 210, and generate a control signal 206, e.g., a voltage signal, based on a feedback signal indicative of the output voltage $V_{OUT}$ and the output currents $I_1, I_2, \ldots, I_N$, or indicative of a combination of the output voltage $V_{OUT}$ and the output currents $I_1, I_2, \ldots, I_N$. The control circuitry 220 can utilize the control signal 206 to control the AC/DC converter 204 to adjust the output voltage $V_{OUT}$, thereby adjusting the output currents $I_1, I_2, \ldots, I_N$ to a target current level.

Figure 2B:
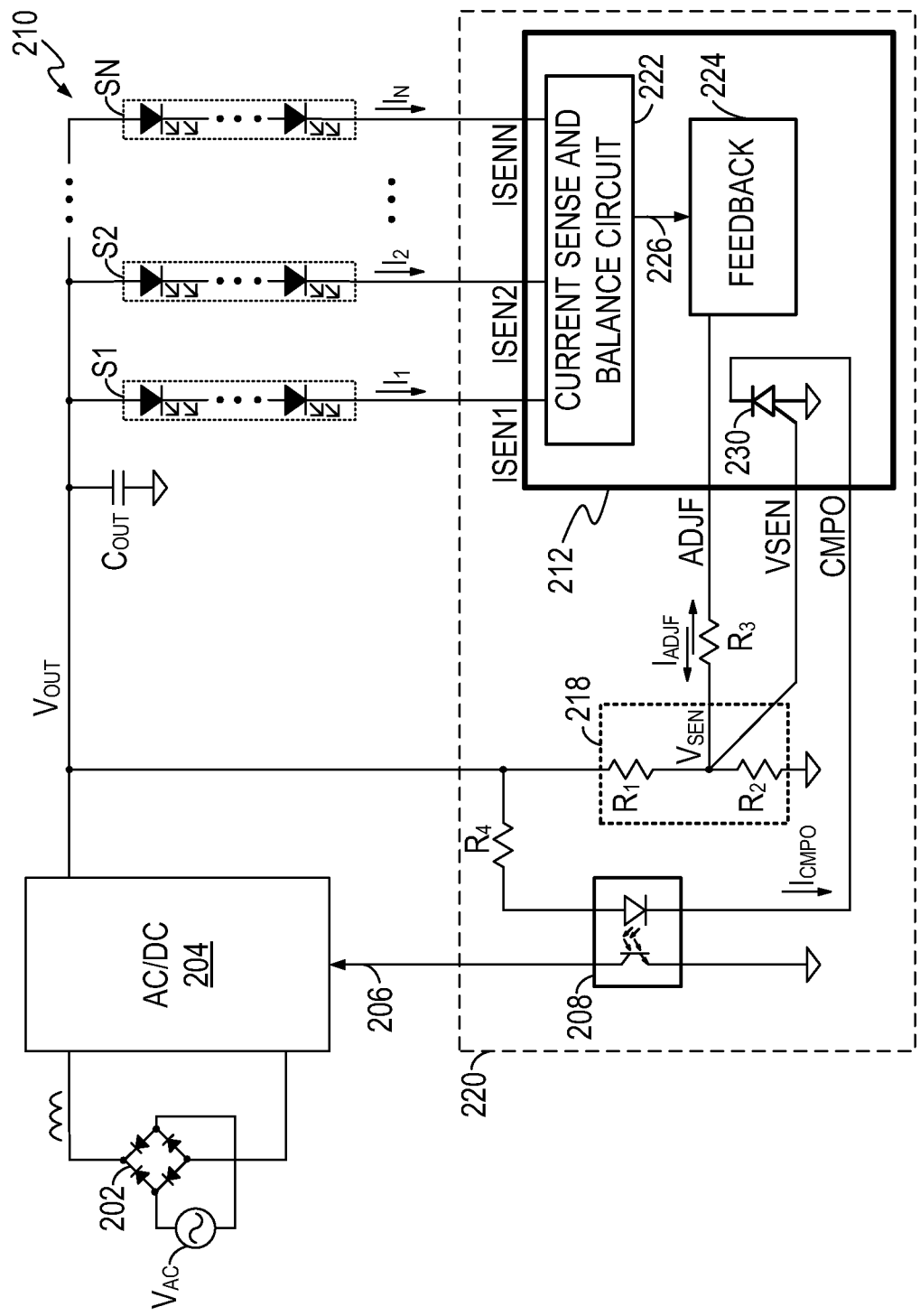
FIG. 2B illustrates a circuit diagram of an example of a light-source driving system, in an embodiment according to the present invention.

An example of a circuit diagram of the control circuitry 220 is shown in FIG. 2B, in an embodiment according to the present invention. As shown in FIG. 2B, the control circuitry 220 includes an optical coupler 208, a voltage feedback circuit 218 such as a voltage divider including resistors $R_1$ and $R_2$, and a controller 212. The controller 212 includes a current feedback circuit 224. The voltage feedback circuit 218 is coupled to the AC/DC converter 204 and can generate a voltage feedback signal $V_{SEN}$ based on the output voltage $V_{OUT}$. The current feedback circuit 224 is coupled to the light source 210 and can generates an adjusting current $I_{ADJF}$ indicative of a difference between the current of the light source 210 and a target current level. The current feedback circuit 224 can adjust the voltage feedback signal by the adjusting current.

In one embodiment, the optical coupler 208 is a component that transfers electrical signals between two isolated circuits by using light. In one embodiment, an equivalent circuit of the optical coupler 208 includes an LED and a phototransistor. A current, e.g., $I_{CMPO}$ shown in FIG. 2B, flowing through the LED causes the LED to emit light. The phototransistor receives the light emitted from the LED and generates an electrical signal, e.g., including a collector current $I_c$ and/or a collector-emitter voltage $V_{CE}$, accordingly. In one embodiment, the optical coupler 208 can receive a control current, e.g., the current $I_{CMPO}$ from the controller 212, and generate a control signal 206 to control the AC/DC converter 204 according to the control current $I_{CMPO}$. For example, when the optical coupler 208 is turned off, e.g., the control current $I_{CMPO}$ is zero amperes, the control signal 206 can be at a higher voltage level, e.g., logic high, determined by a bias circuit in the AC/DC converter 204. When a control current $I_{CMPO}$ is generated to turn on the optical coupler 208, the control signal 206 can be dragged down to a lower voltage level, e.g., logic low. Thus, in one embodiment, the optical coupler 208 can generate a control signal 206 to indicate whether a non-zero control current $I_{CMPO}$ has been generated.

In one embodiment, the controller 212 includes current-sense terminals ISEN1, ISEN2, . . . , ISENN. The number N is determined by the number of LED strings in the light source 210. In one embodiment, the number N can be an arbitrary positive integer. The controller 212 also includes a voltage-sense terminal VSEN, a control terminal CMPO, and an adjusting terminal ADJF. The controller 212 can sense the output currents $I_1, I_2, \ldots, I_N$ via the current-sense terminals ISEN1, ISEN2, . . . , ISENN, respectively. The controller 212 can also generate an adjusting current $I_{ADJF}$ according to the output currents $I_1, I_2, \ldots, I_N$, and provide the adjusting current $I_{ADJF}$ to the voltage feedback circuit 218 via the adjusting terminal ADJF and to adjust a voltage feedback signal $V_{SEN}$ (e.g., a voltage) at the voltage feedback circuit 218. In the example of FIG. 2B, the voltage feedback signal $V_{SEN}$ is the voltage across the resistor $R_2$. Thus, the voltage feedback signal $V_{SEN}$ can be indicative of the output voltage $V_{OUT}$ and the output currents $I_1, I_2, \ldots, I_N$, or a combination of the output voltage $V_{OUT}$ and the output currents $I_1, I_2, \ldots, I_N$. Additionally, the controller 212 can sense the voltage feedback signal $V_{SEN}$ via the voltage-sense terminal VSEN, generate a control current $I_{CMPO}$ according to the voltage feedback signal $V_{SEN}$, and provides the control current $I_{CMPO}$ to the optical coupler 208 via the control terminal CMPO.

Thus, in one embodiment, the controller 212 generates a control current $I_{CMPO}$ to control the AC/DC converter 204 according to the voltage feedback signal $V_{SEN}$ indicative of the output voltage $V_{OUT}$ and the output currents $I_1, I_2, \ldots, I_N$. By way of examples, if a current level (e.g., represented by a current feedback signal $S_{ISEN}$ shown in FIG. 3) of the output currents $I_1, I_2, \ldots, I_N$ is equal to a target current level (e.g., represented by a current reference signal $S_{ADJ}$ shown in FIG. 3), then the controller 212 does not generate the adjusting current $I_{ADJF}$ (e.g., $I_{ADJF}=0$), and therefore the voltage feedback signal $V_{SEN}$ can represent, e.g., be linearly proportional to, the output voltage $V_{OUT}$, e.g., $V_{SEN}=V_{OUT}*R_2/(R_1+R_2)$. The controller 212 can compare the voltage feedback signal $V_{SEN}$ with a voltage reference signal $V_{REF}$ and generate the control current $I_{CMPO}$ according to a difference between the voltage feedback signal $V_{SEN}$ and the voltage reference signal $V_{REF}$. The control current $I_{CMPO}$ can cause the control signal 206 to control the AC/DC converter 204, thereby increasing or decreasing the output voltage $V_{OUT}$ to reduce the difference between the voltage feedback signal $V_{SEN}$ and the voltage reference signal $V_{REF}$. Thus, the voltage feedback signal $V_{SEN}$ can be adjusted to the voltage reference signal $V_{REF}$, and the output voltage $V_{OUT}$ can be adjusted to a target voltage level $V_{TARGET}$ determined by the voltage reference signal $V_{REF}$, e.g., $V_{TARGET}=V_{REF}*(R_1+R_2)/R_2$. If the current level of the output currents $I_1, I_2, \ldots, I_N$ is greater than the target current level, then the controller 212 can output an adjusting current $I_{ADJF}$ to flow into the connection node between the resistors $R_1$ and $R_2$, thereby increasing the voltage across the resistor $R_2$ (i.e., the voltage feedback signal $V_{SEN}$). The increased voltage feedback signal $V_{SEN}$ can cause the control current $I_{CMPO}$ to control the AC/DC converter 204 such that the AC/DC converter 204 decreases the output voltage $V_{OUT}$, e.g., to be less than the above-mentioned target voltage level $V_{TARGET}$, thereby decreasing the current level of the output currents $I_1, I_2, \ldots, I_N$. If the current level of the output currents $I_2, \ldots, I_N$ is less than the target current level, then the controller 212 can sink an adjusting current $I_{ADJF}$ from the connection node between the resistors $R_1$ and $R_2$, thereby decreasing the voltage across the resistor $R_2$ (i.e., the voltage feedback signal $V_{SEN}$). The decreased voltage feedback signal $V_{SEN}$ can cause the control current $I_{CMPO}$ to control the AC/DC converter 204 such that the AC/DC converter 204 increases the output voltage $V_{OUT}$, e.g., to be greater than the above-mentioned target voltage level $V_{TARGET}$, thereby increasing the current level of the output currents $I_1, I_2, \ldots, I_N$.

In other words, in one embodiment, the adjusting terminal ADJF can be an input/output terminal, e.g., a bidirectional terminal, that sinks or outputs an adjusting current $I_{ADJF}$ according a status of the output currents $I_2, \ldots, I_N$. The adjusting current $I_{ADJF}$ can represent a difference between a current level of the output currents $I_1, I_2, \ldots, I_N$ and a target current level, and cause the controller 212 and the AC/DC converter 204 to increase or decrease the output voltage $V_{OUT}$ thereby reducing the difference between the current level of the output currents $I_1, I_2, \ldots, I_N$ and the target current level. As a result, the current level of the output currents $I_1, I_2, \ldots, I_N$ can be adjusted to the target current level.

In one embodiment, the controller 212 includes a current sense and balance circuit 222, a current feedback circuit 224, and a voltage-controlled shunt regulator 230. The current sense and balance circuit 222 can sense the output currents $I_1, I_2, \ldots, I_N$ to determine differences among the output currents $I_1, I_2, \ldots, I_N$, and balance the output currents $I_1, I_2, \ldots, I_N$ by reducing their differences. The current sense and balance circuit 222 can also generate a current feedback signal 226 according to the output currents $I_1, I_2, \ldots, I_N$, and provide the current feedback signal 226 to the current feedback circuit 224. In one embodiment, the current feedback signal 226 can represent an average current level of the output currents $I_1, I_2, \ldots, I_N$. In another embodiment, the current feedback signal 226 can represent any one of the output currents $I_2, \ldots, I_N$ when the output currents $I_1, I_2, \ldots, I_N$ have been balanced with one another. In one embodiment, "balanced with one another" as used herein means that differences among current levels of the output currents $I_1, I_2, \ldots, I_N$ are permissible as long as the differences are relatively small and can be ignored, e.g., within a predetermined small range. The current feedback circuit 224 can receive the current feedback signal 226 and output or sink an adjusting current $I_{ADJF}$ according to the current feedback signal 226. The adjusting current $I_{ADJF}$ can control a voltage feedback signal $V_{SEN}$ at the connection node between the $R_1$ and $R_2$ in the voltage feedback circuit 218. The shunt regulator 230 can sense the voltage feedback signal $V_{SEN}$ and generate a control current $I_{CMPO}$ according to the voltage feedback signal $V_{SEN}$ and a voltage reference signal $V_{REF}$.

Accordingly, in one embodiment, the control circuitry 220 can control the AC/DC converter 204 to increase or decrease the output voltage $V_{OUT}$ according to the voltage feedback signal $V_{SEN}$ indicative of the output voltage $V_{OUT}$ and the output currents $I_1, I_2, \ldots, I_N$, thereby adjusting the output currents $I_1, I_2, \ldots, I_N$ to a target current level. Advantageously, a DC/DC converter in a conventional light-source driving system, e.g., the DC/DC converter 150 mentioned in relation to FIG. 1, can be omitted in the light-source driving system 200. As a result, compared with the conventional light-source driving system, the light-source driving system 200 consumes less power, which reduces its power consumption and increases its power efficiency. The size of a PCB (printed circuit board) for the light-source driving system 200 and the cost for the light-source driving system 200 are also reduced. Additionally, the light-source driving system 200 can include fewer components compared with the conventional light-source driving system, and therefore the light-source driving system 200 can have a higher reliability.

Figure 3:
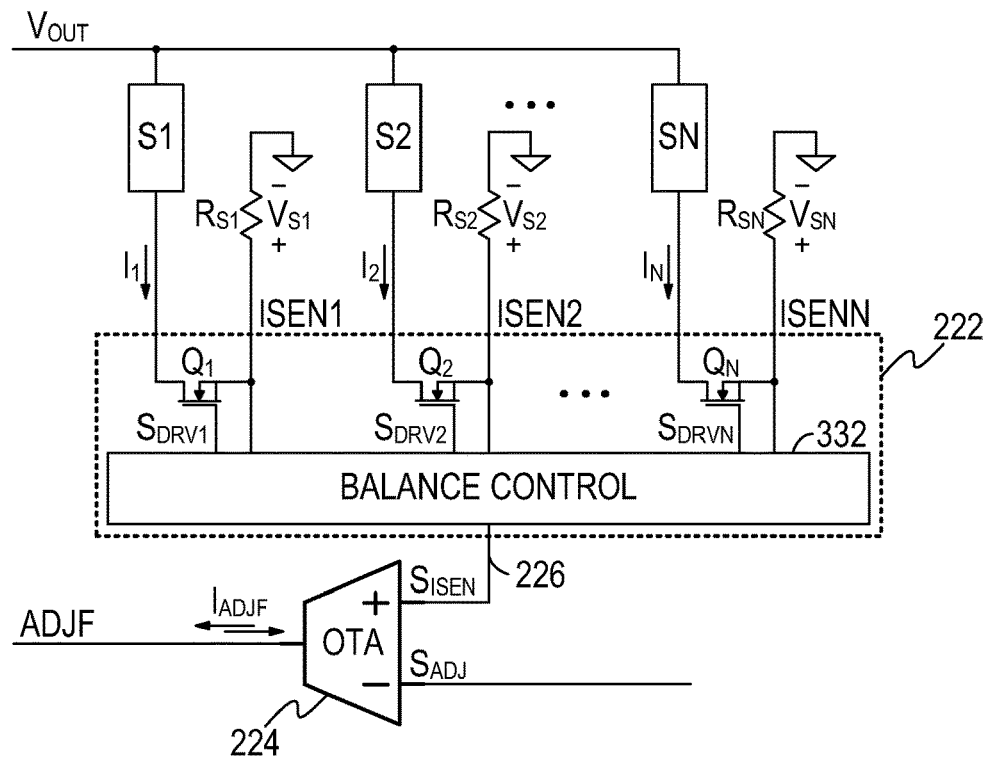
FIG. 3 illustrates a circuit diagram of examples of a current sense and balance circuit and a feedback circuit in FIG. 2B, in an embodiment according to the present invention.

FIG. 3 illustrates a circuit diagram of examples of the current sense and balance circuit 222 and the current feedback circuit 224 in FIG. 2B, in an embodiment according to the present invention. For clarity, some portions of the light-source driving system 200 are not shown in FIG. 3. In FIG. 3, the components labeled S1, S2, . . . , SN represent the LED strings S1, S2, . . . , SN in FIG. 2B. In one embodiment, the current sense and balance circuit 222 includes a set of switches Q1, Q2, . . . , QN and a balance control circuit 332. As shown in FIG. 3, the switches Q1, Q2, . . . , QN are coupled in series to the LED strings S1, S2, . . . , SN and current sensors, e.g., sense resistors, $R_{S1}, R_{S2}, \ldots, R_{SN}$, respectively. The sense resistors $R_{S1}, R_{S2}, \ldots, R_{SN}$ provides sense signals $V_{S1}, V_{S2}, \ldots, V_{SN}$ which indicate output currents $I_1, I_2, \ldots, I_N$ flowing through the LED strings S1, S2, SN. When a switch Qj (j=1, 2, . . . , N) is turned on, a current can be generated to flow through the switch Qj and a corresponding current sensor $R_{Sj}$, and the current sensor $R_{Sj}$ can provide a sense signal, e.g., a voltage $V_{Sj}$ on the current sensor $R_{Sj}$, to a corresponding current-sense terminal ISENj. In one embodiment, the balance control circuit 332 can generate a driving signal $S_{DRVj}$ to alternatively switch on and off the switch Qj. The balance control circuit 332 can also increase the current $I_j$ by increasing a duty cycle of the switch Qj, and decrease the current $I_j$ by decreasing the duty cycle of the switch Qj. As used herein, "a duty cycle of a switch" represents a ratio of a time period during which the switch is turned on to a time period of a switching cycle of the switch. In one embodiment, the balance control circuit 332 can receive the sense signals $V_{S1}, V_{S2}, \ldots, V_{SN}$, generate driving signals $S_{DRV1}, S_{DRV2}, \ldots, S_{DRVN}$ according to the sense signals $V_{S1}, V_{S2}, \ldots, V_{SN}$, and balance the output currents $I_1, I_2, \ldots, I_N$ by using the driving signals $S_{DRV1}, S_{DRV2}, S_{DRVN}$ to control the switches Q1, Q2, . . . , QN. For example, the balance control circuit 332 may compare the sense signals $V_{S1}, V_{S2}, \ldots, V_{SN}$ with a balance reference to generate a set of comparison results. The comparison results can cause the balance control circuit 332 to increase an output current $I_K$ (K=1, 2, . . . , N), e.g., by increasing a duty cycle of the switch QK, if the output current $I_K$ is less than the balance reference. The comparison results can also cause the balance control circuit 332 to decrease an output current $I_L$ (L=1, 2, . . . , N), e.g., by reducing a duty cycle of the switch QL, if the output current $I_L$ is greater than the balance reference. The balance reference may be a predetermined reference signal or a reference signal indicative of an average current level of the output currents $I_1, I_2, \ldots, I_N$. For another example, the balance control circuit 332 may identify a maximum current $I_{MAX}$ of the output currents $I_1, I_2, \ldots, I_N$, and identify a minimum current $I_{MIN}$ of the output currents $I_1, I_2, \ldots, I_N$. If a difference between the maximum current $I_{MAX}$ and the minimum current $I_{MIN}$ is greater than a predetermined threshold, then the balance control circuit 332 may reduce a duty cycle of a switch Q1, Q2, ..., or QN corresponding to the maximum current $I_{MAX}$, and/or increase a duty cycle of a switch Q1, Q2, ..., or QN corresponding to the minimum current $I_{MIN}$, thereby reducing the difference between the maximum current $I_{MAX}$ and the minimum current $I_{MIN}$. Methods for balancing the output currents $I_1, I_2, \ldots, I_N$ are not limited to the examples mentioned herein. The balance control circuit 332 may balance the output currents $I_1, I_2, \ldots, I_N$ based on another method. Advantageously, the output currents $I_1, I_2, \ldots, I_N$ can be balanced with one another and have substantially the same current level. As used herein, "substantially the same current level" means that differences among current levels of the output currents $I_1, I_2, \ldots, I_N$ are permissible as long as the differences are relatively small and can be ignored, e.g., within a predetermined small range.

As mentioned above, the balance control circuit 332 can sense the output currents $I_1, I_2, \ldots, I_N$, e.g., by receiving the sense signals $V_{S1}, V_{S2}, \ldots, V_{SN}$, in one embodiment. Additionally, the balance control circuit 332 can provide a current feedback signal $S_{ISEN}$, indicative of a current level of the output currents $I_1, I_2, \ldots, I_N$, to the current feedback circuit 224. In one embodiment, the current feedback signal $S_{ISEN}$ represents an average current level of the output currents $I_1, I_2, \ldots, I_N$. In another embodiment, the current feedback signal $S_{ISEN}$ can represent any one of the output currents $I_1, I_2, \ldots, I_N$ when the output currents $I_2, \ldots, I_N$ have been balanced with one another. The current feedback circuit 224 generates the adjusting current $I_{ADJF}$ according to the current feedback signal $S_{ISEN}$. In one embodiment, the current feedback circuit 224 includes an OTA (operational transconductance amplifier) having a non-inverting input terminal coupled to the balance control circuit 332 to receive the current feedback signal $S_{ISEN}$, e.g., a voltage signal, and having an inverting input terminal to receive a current reference signal $S_{ADJ}$, e.g., a voltage signal, from a reference signal generator (not shown). In one embodiment, the current reference signal $S_{ADJ}$ represents a target current level of the output currents $I_1, I_2, \ldots, I_N$. Thus, if the current feedback signal $S_{ISEN}$ is greater than the current reference signal $S_{ADJ}$, e.g., indicating that a current level of the output currents $I_1, I_2, \ldots, I_N$ is greater than the target current level, then the current feedback circuit 224, e.g., OTA, can output the adjusting current $I_{ADJF}$. If the current feedback signal $S_{ISEN}$ is less than the current reference signal $S_{ADJ}$, e.g., indicating that a current level of the output currents $I_1, I_2, \ldots, I_N$ is less than the target current level, then the current feedback circuit 224, e.g., OTA, can sink the adjusting current $I_{ADJF}$.

In one embodiment, the current feedback circuit 224 may further include one or more circuit components (not shown in FIG. 3) coupled to the OTA or coupled between the OTA and the voltage feedback circuit 218 (in FIG. 2B). The one or more circuit components can cooperate with the OTA to generate the adjusting current $I_{ADJF}$. Although FIG. 3 shows that the current feedback circuit 224 includes an OTA to generate the adjusting current $I_{ADJF}$, the invention is not so limited. In another embodiment, the current feedback circuit 224 may generate the adjusting current $I_{ADJF}$ without using an OTA. In other words, the current feedback circuit 224 can have a different circuit structure, and in such a circuit structure, the current feedback circuit 224 is capable of outputting an adjusting current $I_{ADJF}$ if the current feedback signal $S_{ISEN}$ is greater than the current reference signal $S_{ADJ}$, and sinking an adjusting current $I_{ADJF}$ if the current feedback signal $S_{ISEN}$ is less than the current reference signal $S_{ADJ}$.

Figure 4:
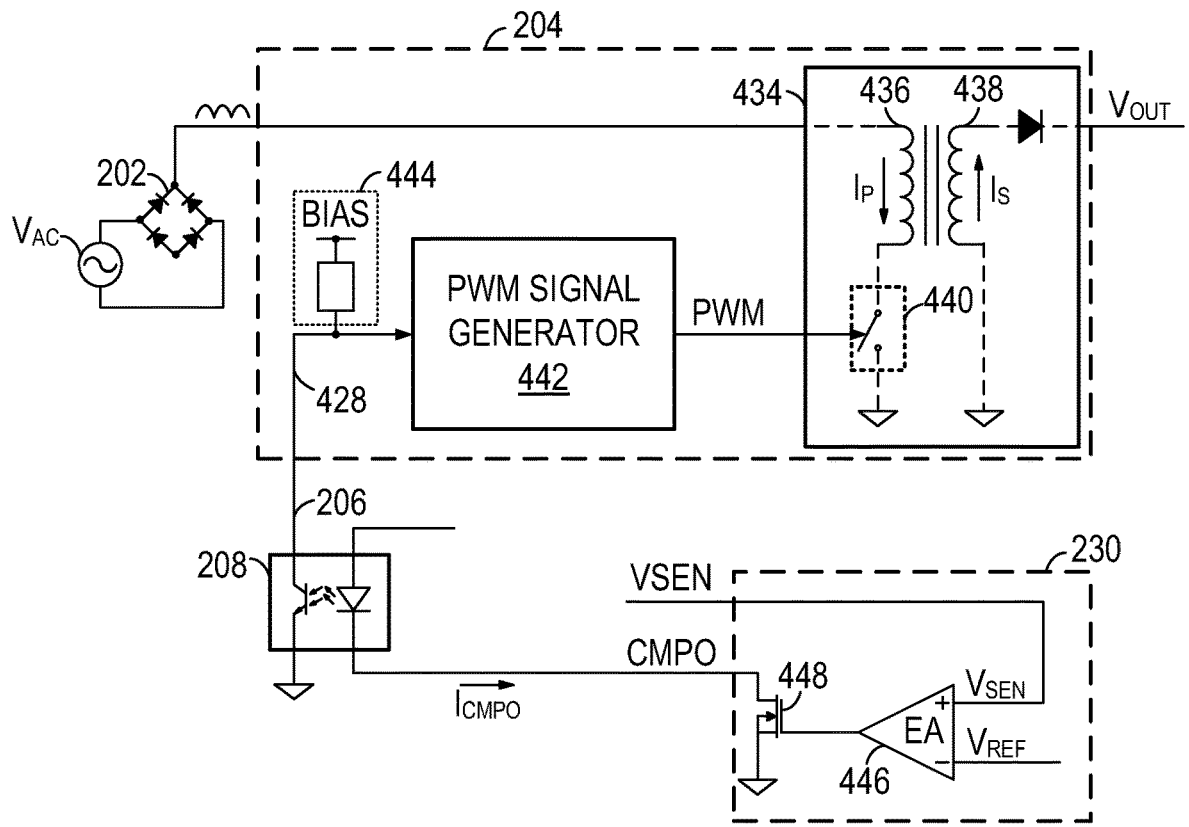
FIG. 4 illustrates a circuit diagram of examples of an AD/DC converter and a voltage-controlled shunt regulator in FIG. 2B, in an embodiment according to the present invention.

FIG. 4 illustrates a circuit diagram of examples of the AC/DC converter 204 and the shunt regulator 230 in FIG. 2B, in an embodiment according to the present invention. For clarity, some portions of the light-source driving system 200 are not shown in FIG. 4. As shown in FIG. 4, the AC/DC converter 204 includes a PWM (pulse-width modulation) signal generator 442 and a switching-mode transformer circuitry 434. The PWM signal generator 442 can generate a PWM signal to control the transformer circuitry 434 such that the transformer circuitry 434 converters an AC voltage $V_{AC}$ to an output voltage $V_{OUT}$.

More specifically, in one embodiment, the transformer circuitry 434 can be any type of converter that is capable of converting an input signal, e.g., the AC voltage $V_{AC}$, to an output signal, e.g., the output voltage $V_{OUT}$, and controlling the output signal to a preset target level. For example, the transformer circuitry 434 can have a flyback converter topology, a forward converter topology, a push-pull converter topology, a center-tapped transformer topology, or the like. In one embodiment, the transformer circuitry 434 includes a primary winding circuit 436 (e.g., including one or more primary windings), a switch circuit 440 (e.g., including a switch, a half-bridge circuit, a full-bridge circuit, or the like) coupled to the primary winding circuit 436, and a secondary winding circuit 438 (e.g., including one or more secondary windings) magnetically coupled to the primary winding circuit 436. In one embodiment, the transformer circuitry 434 is in a flyback transformer topology. When the PWM is in a first state, e.g., logic high (or logic low), the switch circuit 440 can enable power transfer from the power source $V_{AC}$ to the primary winding circuit 436, a primary current $I_P$ can be generated to flow through the primary winding circuit 436, and the magnetic core of the transformer circuitry 434 can store magnetic energy. When the PWM is in a second state, e.g., logic low (or logic high), the switch circuit 440 can disconnect the primary winding circuit 436 from the power source $V_{AC}$, the magnetic core of the transformer circuitry 434 can release magnetic energy to the secondary winding circuit 438, and a secondary current $I_S$ can be generated to flow through the secondary winding circuit 438 to the light source 210 (shown in FIG. 2B). In another embodiment, the transformer circuitry 434 is in a center-tapped transformer topology. When the PWM is in a first state, e.g., logic high (or logic low), the switch circuit 440 can enable power transfer from the power source $V_{AC}$ to the primary winding circuit 436, a primary current $I_P$ can be generated to flow through the primary winding circuit 436, which can cause a secondary current $I_S$ to be generated to flow through the secondary winding circuit 438 to the light source 210 (shown in FIG. 2B). The primary current $I_P$ and the secondary current $I_S$ can increase, and the magnetic core of the transformer circuitry 434 can store magnetic energy. When the PWM is in a second state, e.g., logic low (or logic high), the switch circuit 440 can disconnect the primary winding circuit 436 from the power source $V_{AC}$, the magnetic core of the transformer circuitry 434 can release magnetic energy to the secondary winding circuit 438, and the secondary current $I_S$ can decrease. The PWM signal generator 442 can generate the PWM signal to control the switch circuit 440 thereby alternately enabling and disabling the power transfer from the power source $V_{AC}$ to the primary winding circuit 436. The PWM signal generator 442 can increase the output voltage $V_{OUT}$ by increasing a duty cycle of the switch circuit 440, and decrease the output voltage $V_{OUT}$ by decreasing the duty cycle of the switch circuit 440. As used herein, "a duty cycle of the switch circuit 440" represents a ratio of a time period during which the primary winding circuit 436 receives power from the power source $V_{AC}$ to a time period of an alternation cycle of the switch circuit 440.

In the example of FIG. 4, the shunt regulator 230 includes an error amplifier 446, e.g., an operational amplifier, having a non-inverting input terminal coupled to the voltage-sense terminal VSEN to receive the voltage feedback signal $V_{SEN}$, and an inverting input terminal to receive a voltage reference signal $V_{REF}$ from a reference signal generator (not shown). The voltage reference signal $V_{REF}$ can represent a target voltage level of the output voltage $V_{OUT}$ when the output currents $I_1, I_2, \ldots, I_N$ have been adjusted to a target current level, e.g., $I_{ADJF}=0$. The shunt regulator 230 also includes a switch 448, e.g., a MOSFET (metal-oxide-semiconductor field-effect transistor) having a control terminal, e.g., a gate terminal, coupled to the error amplifier 446 and controlled by the output of the error amplifier 446. The switch 448 is also coupled to the control terminal CMPO, and can provide a control current $I_{CMPO}$ under the control of the voltage feedback signal $V_{SEN}$. For example, if the voltage feedback signal $V_{SEN}$ is less than the voltage reference signal $V_{REF}$, then the error amplifier 446 turns off the switch 448, and no current flows through the optical coupler 208. If the voltage feedback signal $V_{SEN}$ is greater than the voltage reference signal $V_{REF}$, then the error amplifier 446 turns on the switch 448, and the control current $I_{CMPO}$ is generated to flow through the optical coupler 208 and the switch 448 to ground, and the optical coupler 208 is turned on.

In one embodiment, when the voltage feedback signal $V_{SEN}$ is less than the voltage reference signal $V_{REF}$, the optical coupler 208 is turned off, and a status (e.g., a voltage level) of the signal line 428 is determined by a bias circuit 444 in the AC/DC converter 204. For example, the bias circuit 444 may provide a first voltage level, e.g., a logic-high voltage level, to the signal line 428 when the optical coupler 208 is turned off. Thus a voltage level of the control signal 206 can be controlled to the first voltage level, e.g., the logic-high voltage level. When the voltage feedback signal $V_{SEN}$ is greater than the voltage reference signal $V_{REF}$, the optical coupler 208 is turned on, and a voltage level of the control signal 206 can be controlled to a second voltage level, e.g., dragged down to a logic-low voltage level by the optical coupler 208. Thus, in one embodiment, the status of the signal line 428 can be at a first voltage level, e.g., logic high, when the voltage feedback signal $V_{SEN}$ is less than the voltage reference signal $V_{REF}$, and at a second voltage level, e.g., logic low, when the voltage feedback signal $V_{SEN}$ is greater than the voltage reference signal $V_{REF}$. In one embodiment, the first voltage level of the control signal 206 can control the PWM signal generator 442 to increase the output voltage $V_{OUT}$, and the second voltage level of the control signal 206 can control the PWM signal generator 442 to decrease the output voltage $V_{OUT}$. As a result, the voltage feedback signal $V_{SEN}$ can be adjusted to the voltage reference signal $V_{REF}$, and the output voltage $V_{OUT}$ can be adjusted to a voltage level that maintains the output currents $I_1, I_2, \ldots, I_N$ at a target current level. As described above, the control current $I_{CMPO}$ is generated based on a comparison of the voltage feedback signal $V_{SEN}$ and the voltage reference signal $V_{REF}$. The optical coupler 208 provides the control signal 206 based on the control current $I_{CMPO}$. The AC/DC converter 204 is controlled by the control signal 206 to adjust the output voltage $V_{OUT}$.

Advantageously, in one embodiment, the optical coupler 208 is a component that transfers electrical signals between two isolated circuits by using light. Thus, the optical coupler 208 can prevent the AC voltage $V_{AC}$, e.g., a high voltage, from affecting the AC/DC converter 204 receiving feedback from the shunt regulator 230.

Figure 5:
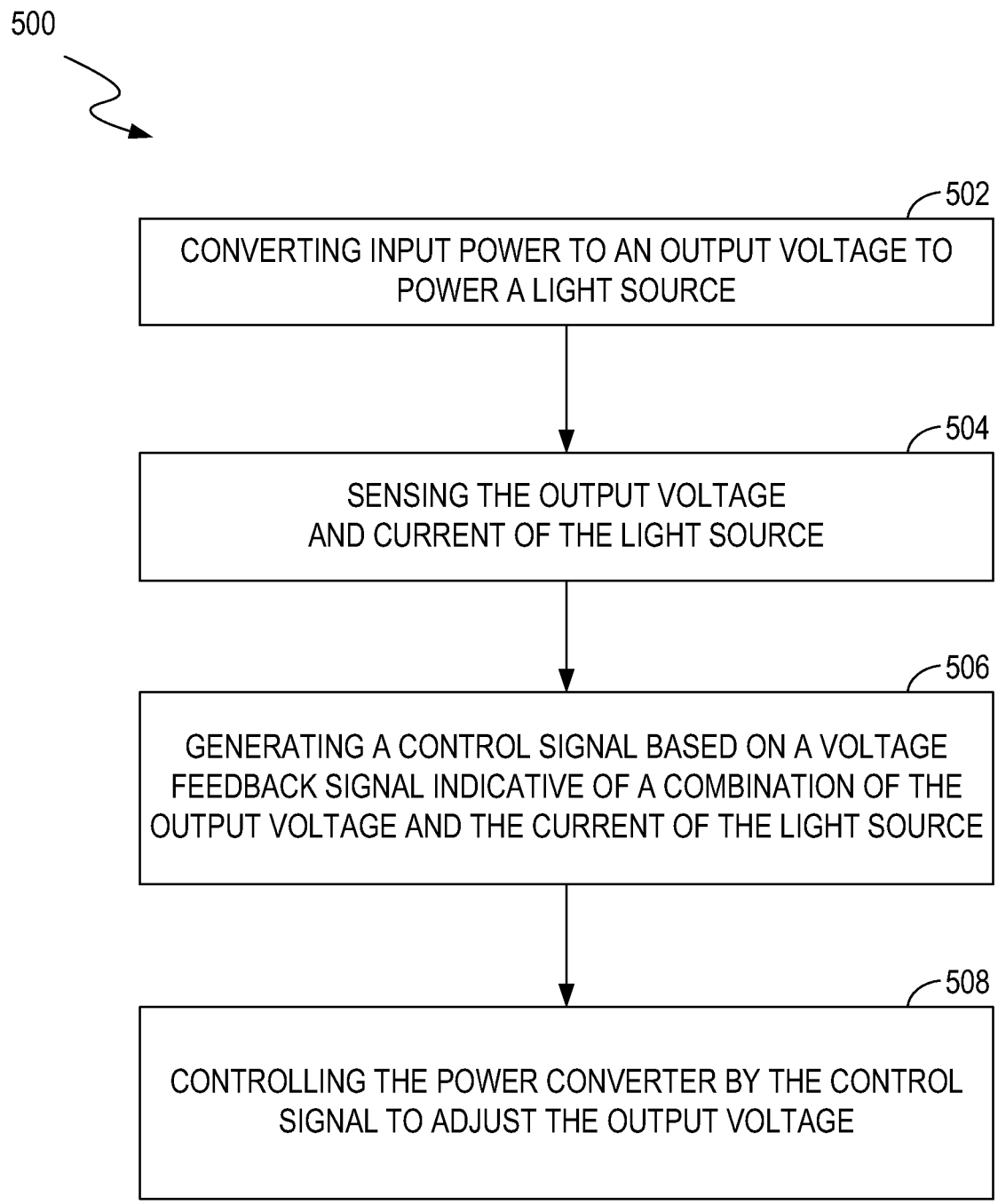
FIG. 5 illustrates a flowchart of a method for driving a light source, in an embodiment according to the present invention.

FIG. 5 illustrates a flowchart of a method for driving a light source, in an embodiment according to the present invention. FIG. 5 is described in combination with FIG. 2A, FIG. 2B, FIG. 3 and FIG. 4.

In block 502, a power converter, e.g., the AC/DC converter 204 in FIG. 2A and FIG. 2B, converters input power, e.g., power output from the rectifier 202, to an output voltage $V_{OUT}$ to power a light source 210.

In block 504, a control circuitry 220 senses the output voltage and senses the output current (e.g., the current of the light source 210).

In block 506, the control circuitry 220 generates a control signal 206 based on a voltage feedback signal $V_{SEN}$ indicative of a combination of the output voltage and the current of the light source 210.

In block 508, the power converter is controlled by the control signal 206 to adjust the output voltage.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. A light-source driving system, comprising:
   a power converter operable for converting an input power to an output voltage to power a light source, and
   a control circuitry, coupled to said power converter, operable for sensing said output voltage and current of said light source, generating a control signal based on a voltage feedback signal indicative of a combination of said output voltage and said current of said light source, and controlling said power converter by said control signal to adjust said output voltage, wherein said control circuitry comprises:
   a voltage feedback circuit coupled to said power converter; and
   a current feedback circuit coupled to said light source,
   wherein said voltage feedback circuit is operable for generating said voltage feedback signal based on said output voltage,
   wherein said current feedback circuit is operable for generating an adjusting current indicative of a difference between said current of said light source and a target current level, wherein said current feedback circuit is further operable for adjusting said voltage feedback signal by said adjusting current, wherein said current feedback circuit generates said adjusting current to increase said voltage feedback signal if said current of said light source is greater than said target current level, wherein said current feedback circuit generates said adjusting current to decrease said voltage feedback signal if said current of said light source is less than said target current level.

2. The light-source driving system of claim 1, wherein said control circuitry generates said control signal based on a comparison of said voltage feedback signal and a voltage reference signal.

3. The light-source driving system of claim 2, wherein said power converter adjusts said output voltage to a target voltage level if said current of said light source is equal to said target current level, wherein said power converter adjusts said output voltage to be less than said target voltage level if said current of said light source is greater than said target current level, wherein said power converter adjusts said output voltage to be greater than said target voltage level if said current of said light source is less than said target current level.

4. The light-source driving system of claim 1, wherein said light source comprises a plurality of LED (light-emitting diode) strings, wherein said control circuitry further comprises a current sense and balance circuit coupled to said LED strings, wherein said current sense and balance circuit is operable for balancing current of said LED strings and generating a current feedback signal according to said current of said LED strings, wherein said current feedback circuit is operable for generating said adjusting current according to said current feedback signal.

5. The light-source driving system of claim 4, wherein said current feedback signal indicates an average current level of said current of said LED strings.

6. The light-source driving system of claim 4, wherein said current feedback signal indicates current of any one of said LED strings when said current of said LED strings have been balanced with one other.

7. The light-source driving system of claim 4, wherein said current feedback circuit is operable for generating said adjusting current based on said current feedback signal and a current reference signal indicating said target current level, wherein said current feedback circuit sinks said adjusting current if said current feedback signal is less than said current reference signal, and wherein said current feedback circuit outputs said adjusting current if said current feedback signal is greater than said current reference signal.

8. The light-source driving system of claim 7, wherein said voltage feedback circuit comprises a resistor, wherein said voltage feedback signal represents a voltage across said resistor, wherein said voltage across said resistor increases if said current feedback circuit outputs said adjusting current, wherein said voltage across said resistor decreases if said current feedback circuit sinks said adjusting current.

9. The light-source driving system of claim 1, wherein said control circuitry further comprises:
 a shunt regulator, coupled to said voltage feedback circuit, operable for generating a control current based on said voltage feedback signal and a voltage reference signal, wherein said voltage reference signal indicates a target voltage level of said output voltage; and
 an optical coupler, coupled between said shunt regulator and said power converter, operable for proving said control signal based on said control current.

10. The light-source driving system of claim 9, wherein said optical coupler is turned off and said control signal has a first voltage level if said voltage feedback signal is less than said voltage reference signal, wherein said optical coupler is turned on and said control signal has a second voltage level if said voltage feedback signal is greater than said voltage reference signal.

11. The light-source driving system of claim 10, wherein said power converter increases said output voltage if said control signal has said first voltage level, wherein said power converter decreases said output voltage if said control signal has said second voltage level.

12. A method for driving a light source, comprising:
 converting, by a power converter, an input power to an output voltage to power said light source;
 sensing, by a control circuitry, said output voltage and current of said light source;
 generating, by said control circuitry, a control signal based on a voltage feedback signal indicative of a combination of said output voltage and said current of said light source;
 controlling, by said control circuitry, said power converter by said control signal to adjust said output voltage;
 generating, by a voltage feedback circuit, said voltage feedback signal based on said output voltage;
 generating, by a current feedback circuit, an adjusting current based on said current of said light source, wherein said adjusting current is indicative of a difference between said current of said light source and a target current level; and
 adjusting, by said current feedback circuit, said voltage feedback signal by said adjusting current,
 wherein said adjusting said voltage feedback signal by said adjusting current comprises:
 generating, by said current feedback circuit, said adjusting current to increase said voltage feedback signal if said current of said light source is greater than said target current level, and
 generating, by said current feedback circuit, said adjusting current to decrease said voltage feedback signal if said current of said light source is less than said target current level.

13. The method of claim 12, wherein said generating said control signal comprises:
 comparing said voltage feedback signal with a voltage reference signal which indicates a target voltage level.

14. The method of claim 13, wherein said controlling said power converter by said control signal comprises:
 adjusting said output voltage to said target voltage level if said current of said light source is equal to said target current level;
 adjusting said output voltage to be less than said target voltage level if said current of said light source is greater than said target current level; and
 adjusting said output voltage to be greater than said target voltage level if said current of said light source is less than said target current level.

15. The method of claim 12, wherein said generating said adjusting current based on said current of said light source comprises:
 generating a current feedback signal indicating an average current level of current of plurality of LED (light-emitting diode) strings in said light source; and
 generating said adjusting current according to said current feedback signal.

16. The method of claim 12, wherein said generating said adjusting current based on said current of said light source comprises:
- generating a current feedback signal indicating current of any one LED (light-emitting diode) string of a plurality of LED strings in said light source; and
- generating said adjusting current according to said current feedback signal.

\* \* \* \* \*